(12) United States Patent
Nagaoka et al.

(10) Patent No.: US 10,196,838 B2
(45) Date of Patent: Feb. 5, 2019

(54) VEHICLE DOOR LATCH DEVICE

(71) Applicant: MITSUI KINZOKU ACT CORPORATION, Yokohama-shi, Kanagawa (JP)

(72) Inventors: Tomoharu Nagaoka, Yokohama (JP); Hideaki Nozawa, Yokohama (JP)

(73) Assignee: MITSUI KINZOKU ACT CORPORATION, Yokohama-Shi (JP)

( * ) Notice: Subject to any disclaimer, the term of this patent is extended or adjusted under 35 U.S.C. 154(b) by 385 days.

(21) Appl. No.: 14/901,735

(22) PCT Filed: Nov. 12, 2014

(86) PCT No.: PCT/JP2014/079912
§ 371 (c)(1),
(2) Date: Dec. 29, 2015

(87) PCT Pub. No.: WO2015/136775
PCT Pub. Date: Sep. 17, 2015

(65) Prior Publication Data
US 2016/0369533 A1  Dec. 22, 2016

(30) Foreign Application Priority Data

Mar. 13, 2014  (JP) ................................ 2014-049691

(51) Int. Cl.
*E05B 79/20* (2014.01)
*E05B 79/10* (2014.01)
(Continued)

(52) U.S. Cl.
CPC .............. *E05B 79/20* (2013.01); *E05B 79/10* (2013.01); *E05B 85/02* (2013.01);
(Continued)

(58) Field of Classification Search
CPC .. F16C 1/105; F16C 1/26; E05B 85/10; E05B 79/20
(Continued)

(56) References Cited

U.S. PATENT DOCUMENTS 5,350,206 A * 9/1994 Akahori .............. E05B 63/0056
292/336.3
6,988,752 B2 * 1/2006 Belchine, III .......... E05B 85/12
16/266

(Continued)

FOREIGN PATENT DOCUMENTS

DE  102004002755 A1 * 8/2005 ............. E05B 79/12
DE  102013109912 A1 * 3/2015 ............. E05B 81/14

(Continued)

OTHER PUBLICATIONS

International Search Report Corresponding to PCT/JP2014/079912 dated Jan. 13, 2015.
Written Opinion Corresponding to PCT/JP2014/079912 dated Jan. 13, 2015.

*Primary Examiner* — Carlos Lugo
(74) *Attorney, Agent, or Firm* — Davis & Bujold PLLC; Michael J. Bujold

(57) ABSTRACT

A vehicle door latch device which efficiently performs connecting a motion-transmitting member to an operating lever and attaching an auxiliary cover to a housing simultaneously from one direction is provided. The auxiliary cover comprises a holding portion which is capable of holding the motion-transmitting members to the side facing a coupling area; and positioning mechanism which can position coupling portions of the motion-transmitting member. Without fixing the auxiliary cover to the coupling area, the motion-transmitting members are held by the holding portion. The coupling portions are positioned by the positioning mechanism. By fixing the auxiliary cover to the coupling area, the coupling portions can be coupled to (Continued)

coupled portions of the operating levers which are stationary at a predetermined position.

2 Claims, 5 Drawing Sheets

(51) Int. Cl.
    *E05B 85/02*     (2014.01)
    *F16C 1/26*     (2006.01)
    *F16C 1/10*     (2006.01)
    *E05B 85/10*     (2014.01)
    *E05B 77/34*     (2014.01)
    *E05B 17/00*     (2006.01)

(52) U.S. Cl.
    CPC ........... *E05B 17/0012* (2013.01); *E05B 77/34* (2013.01); *E05B 85/10* (2013.01); *F16C 1/105* (2013.01); *F16C 1/26* (2013.01)

(58) Field of Classification Search
    USPC ...................................................... 292/336.3
    See application file for complete search history.

(56) References Cited

U.S. PATENT DOCUMENTS

| | | | | |
|---|---|---|---|---|
| 7,201,081 B2 * | 4/2007 | Mossier | ................. | E05B 85/12 |
| | | | | 74/500.5 |
| 7,520,195 B2 * | 4/2009 | Dupont | ................... | F16C 1/105 |
| | | | | 439/322 |
| 7,637,542 B2 * | 12/2009 | Suzumura | ............... | E05B 77/34 |
| | | | | 292/201 |
| 8,864,193 B2 * | 10/2014 | Mori | ....................... | E05B 79/20 |
| | | | | 292/336.3 |
| 9,540,854 B2 * | 1/2017 | Graute | ................... | E05B 77/34 |
| 9,758,992 B2 * | 9/2017 | Kouzuma | ............... | E05B 81/14 |

FOREIGN PATENT DOCUMENTS

| | | | | | |
|---|---|---|---|---|---|
| EP | | 3219888 A1 | * | 9/2017 | ............ E05B 77/34 |
| FR | | 2876077 A1 | * | 4/2006 | ............ E05B 79/06 |
| JP | | 2003-239601 A | | 8/2003 | |
| JP | | 4293116 B2 | | 6/2006 | |
| JP | | 2012-180702 A | | 9/2012 | |
| JP | | 2014227758 A | * | 12/2014 | ............ E05B 85/13 |
| KR | | 20070025706 A | * | 3/2007 | |

* cited by examiner

VEHICLE DOOR LATCH DEVICE

BACKGROUND OF THE INVENTION

The present invention relates to a vehicle door latch device.

In a conventional door latch device, between a synthetic-resin housing and a cover for closing one side of the housing, the ends of operating levers such as an inside lever and a locking lever are exposed from an opening of the housing, and the end of an inner cable of a Bowden cable as a motion-transmitting member is coupled to the ends of the operating levers, and after the end of an outer tube of the Bowden cable is fixed to a cable coupling area of the cover, the auxiliary cover covers a coupling portion between the inner cable and the operating levers, and the end of the outer tube in JP2012-180702A and JP4293116B2

However, in the vehicle door latch devices in Patent Literatures 1 and 2, the auxiliary cover is coupled over the cable coupling area of the cover with a hinge to open and close. Hence, it is not possible at the same time to couple the end of the Bowden cable to the ends of the operating levers, to attach the auxiliary cover over the cable coupling area and to fix the end of the outer cable. Specifically, while the auxiliary cover is open, the end of the inner cable is coupled to the ends of the operating levers and the end of the outer tube of the Bowden cable is fixed to the cable coupling area. Then, the auxiliary cover is turned toward the cable coupling area around the hinge and it is necessary to cover the coupling portion between the inner cable and operating levers and the end of the outer tube. It is not possible to assemble the motion-transmitting member and auxiliary cover to the door latch device efficiently.

Recently in order to improve assembling efficiency of the door latch device, automatic assembling is carried out. In the assembling method, it is difficult to couple the ends of the Bowden cable to the ends of the operating levers automatically while they are positioned. It is necessary to cover the auxiliary cover by turning it over the cable coupling area. It is not possible automatically in one direction to attach the auxiliary cover over the cable coupling area, to couple the end of the inner cable to the ends of the operating levers and to couple the operating levers to the housing, thereby reducing assembling efficiency.

SUMMARY OF THE INVENTION

In view of the disadvantages in the prior art, it is an object of the invention to provide a vehicle door latch device which is capable of coupling a motion-transmitting member to an operating lever and to attach an auxiliary cover over a cable coupling area of a housing at the same time from one direction more efficiently.

DETAILED DESCRIPTION OF PREFERRED EMBODIMENT

Figure 1:
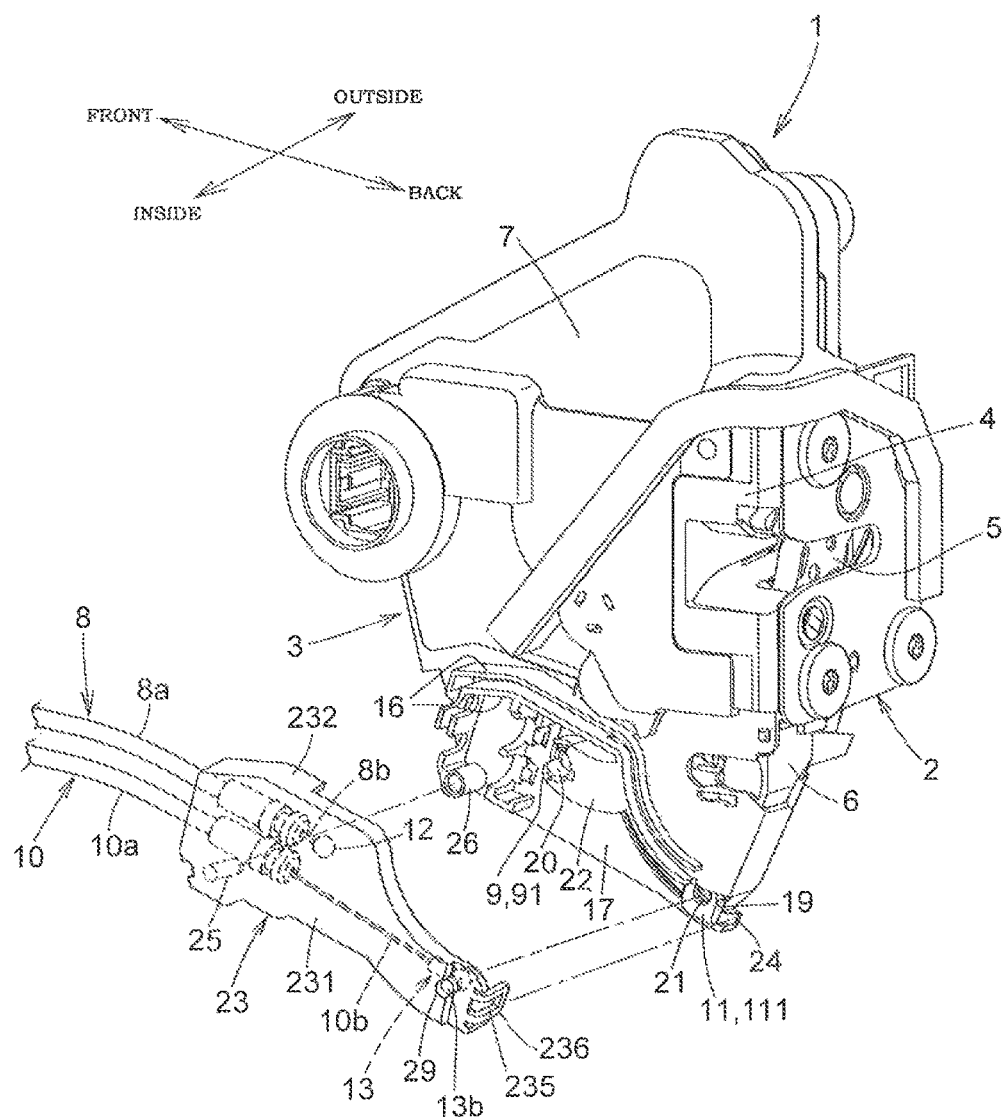
FIG. 1 is a perspective view of a door latch device according the present invention before an auxiliary cover is mounted, viewed from the inside of a vehicle.
Figure 2:
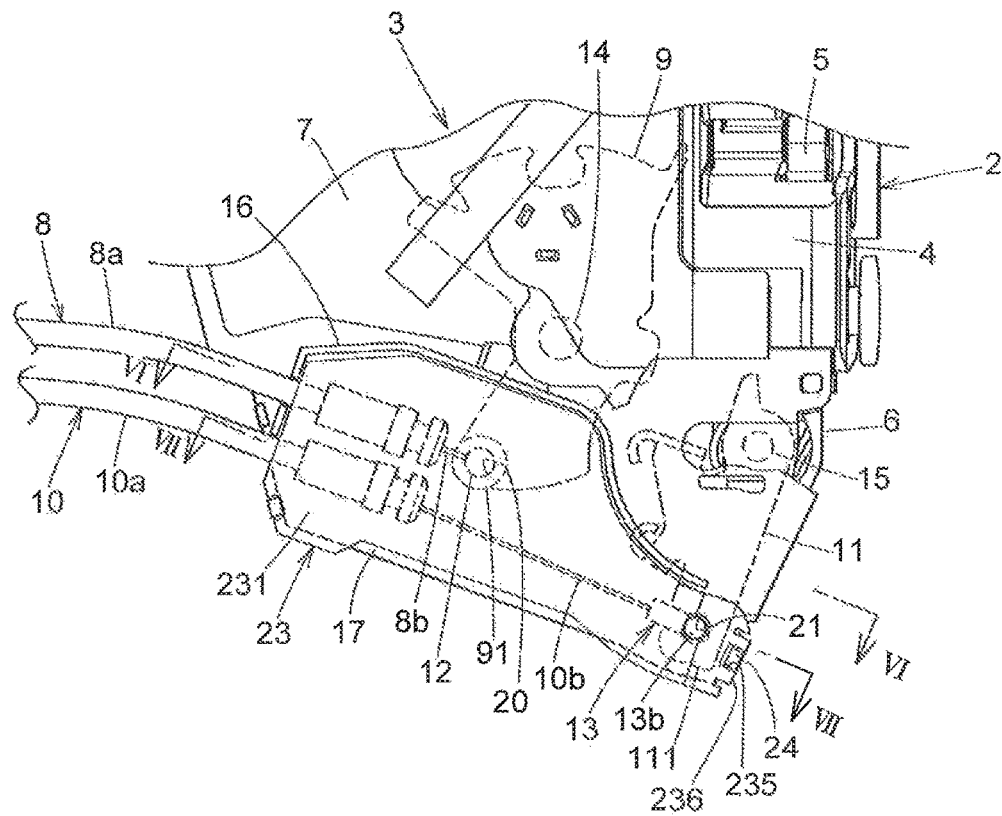
FIG. 2 is a side elevational view of the door latch device after the auxiliary cover is mounted, viewed from the inside of the vehicle.
Figure 3:
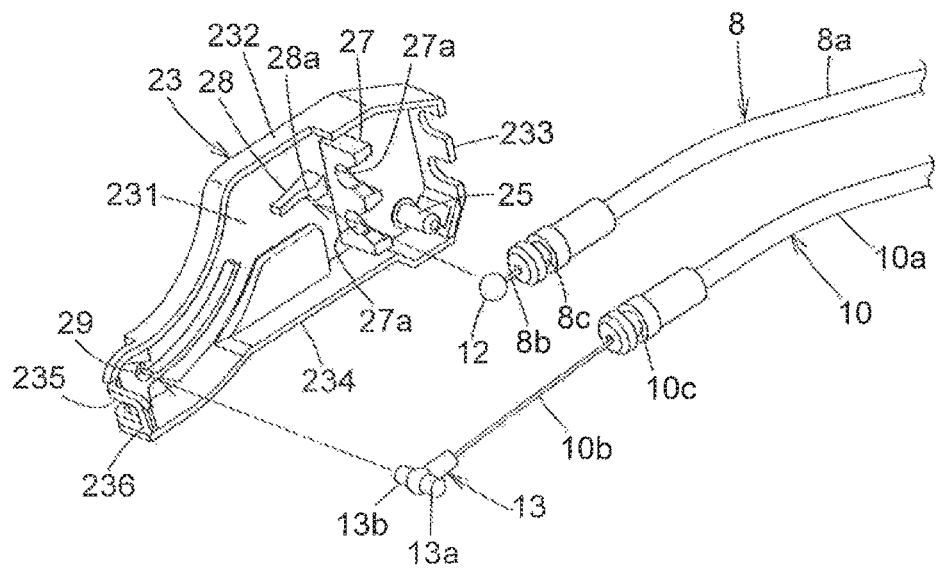
FIG. 3 is a perspective view of the auxiliary cover and a Bowden cable mounted thereto, viewed from the outside of the vehicle.
Figure 4:
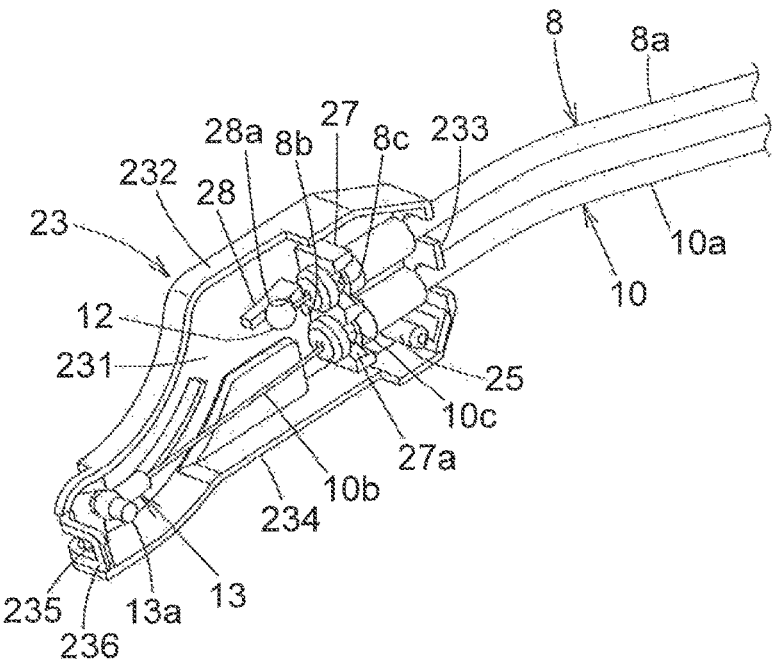
FIG. 4 is a perspective view of the auxiliary cover after the Bowden cable is mounted, viewed from the outside of the vehicle.

One embodiment of a vehicle door latch device according to the present invention will be described with respect to FIGS. 1-9. In the following description, an obliquely left-upper direction is a front of a vehicle; an obliquely right-lower direction is a back; an obliquely left-lower direction is an inside: and an obliquely right-upper direction is an outside.

A door latch device 1 is mounted to the rear end in a door (not shown) of a vehicle and comprises an engagement unit 2 for holding the door closed and an operation unit 3 mounted to the engagement unit 2.

The engagement unit 2 comprises a synthetic-resin body 4 fixed in the door with a bolt (not shown). In the body 4, there is an engagement mechanism which includes a latch 5 (in FIG. 1) engagable with a striker (not shown) of the vehicle body and a pawl (not shown) engagable with the latch 5. When the door is closed, the latch 5 engages with the striker and the pawl engages with the latch 5 so as to hold the door closed. The engagement unit 2 is known and does not directly relate to the present invention. Its details are not described.

The operation unit 3 is fixed to the body 4 and comprises a synthetic-resin housing 6 which has an opening toward the inside of the vehicle and a synthetic-resin cover 7 which is fixed to the opening of the housing 6 and closes an operation mechanism for levers and a motor installed in the housing. The cover 7 is part of the housing 6 in this invention.

The operating levers in the housing 6 includes a locking lever 9 connected to a locking knob (not shown) on an inner side of the door via a first Bowden cable 8 as a motion-transmitting member; and an inside lever 11 connected to an inside handle (not shown) on the inner side of the door to open the door via a second Bowden cable 10 as a motion-transmitting member. The locking knob and inside handle correspond to an operating device according to the present invention.

The first Bowden cable 8 and second Bowden cable 10 comprise flexible inner cables 8b, 10b which slide longitudinally through flexible outer tubes 8a, 10a respectively. A spherical coupling portion 12 and a T-shaped axial coupling portion 13 are fixed respectively to the terminals (rear ends) of the inner cables 8b, 10b connected to the locking lever 9 and inside lever 11 in FIG. 3. The coupling portion 13 of the second Bowden cable 10 comprises an axial coupling portion 13a which extends transversely toward the outside of the vehicle and is engagable in a coupling hole 21 (later described) at the lower end of the inside lever 11 and a positioning portion 13b which extends transversely toward the inside of the vehicle and fits a positioning hole 29 of an auxiliary cover 23 (later described). The axial coupling portion 13a and the positioning portion 13b extend opposite each other perpendicular to the inner cable 10b.

The locking lever 9 and inside lever 11 are pivotally supported via a pivot shaft 14 and a pivot shaft 15 respectively which lie transversely of the vehicle in the housing 6.

Figure 5:
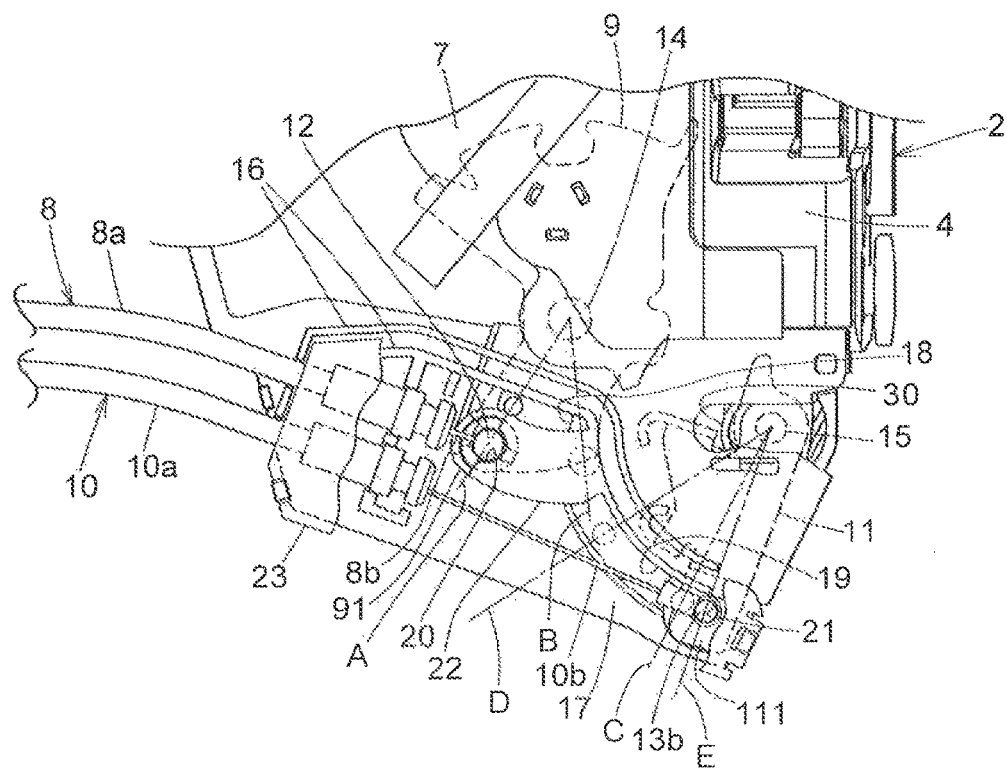
FIG. 5 is a side elevational view of the door latch device in which the auxiliary cover is partially cut away, viewed from the inside of the vehicle.

In FIGS. 1 and 5, on the lower part of the side of the cover 7 which faces the inside of the vehicle, there are two walls 16, 16 spaced from each other in parallel. Each of the walls 16, 16 tilts downward at the front part, downward at the rear part and slightly forward and upward at the intermediate part. Under the lower projection 16 of the cover 7, there is a cable-coupling area 17 for connection to the rear ends of the first Bowden cable 8 and second Bowden cable 10.

A lower end 91 of the locking lever 9 coupled to the coupling portion 12 of the first Bowden cable 8 is exposed in the cable-coupling area 17 from an opening 18 of the cover 7 so that the coupling portion 12 of the first Bowden cable 8 may be coupled at the inside of the vehicle. A lower end 111 of the inside lever 11 coupled to the axial coupling portion 13a of the second Bowden cable 10 is exposed in the cable-coupling area 17 from an arcuate notch 19 of the cover 7 so that the axial coupling portion 13a of the second Bowden cable 10 may be coupled at the inside of the vehicle.

Figure 6:
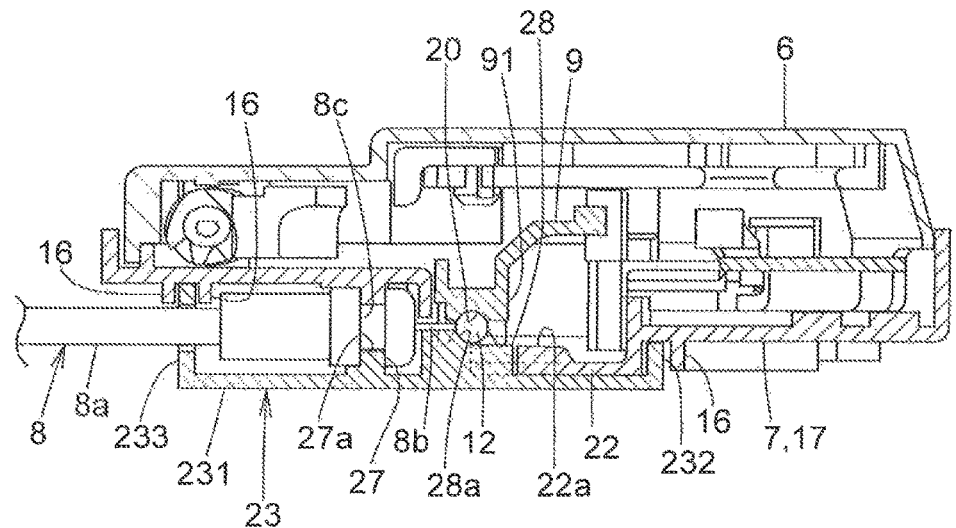
FIG. 6 is an enlarged horizontal sectional plan view taken along the line VI-VI in FIG. 2.
Figure 7:
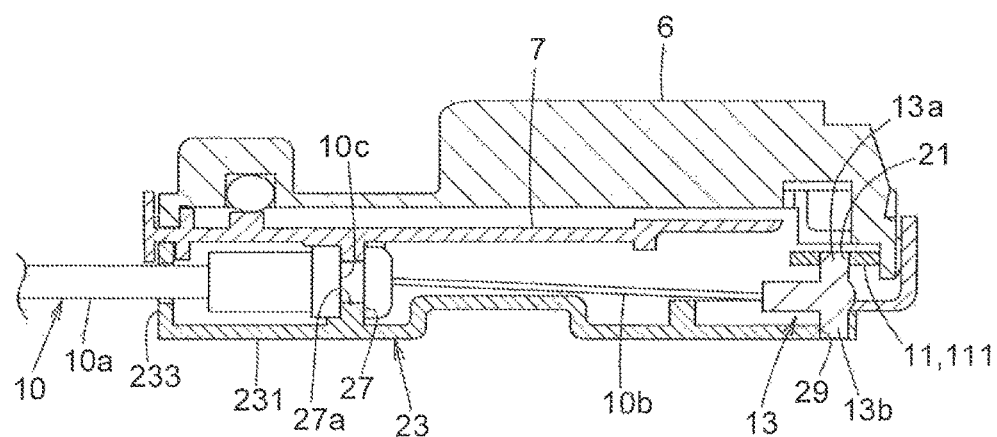
FIG. 7 is an enlarged horizontal sectional plan view taken along the line VII-VII in FIG. 2.

In FIGS. 1 and 6, at the lower end of the locking lever 9, there is formed a recess 20 having a semi-spherical section which is open toward the inside of the vehicle. The coupling portion 12 of the first Bowden cable 8 can fit into the recess 20 from the inside of the vehicle. At the lower end 111 of the inside lever 11, there is formed a coupling hole 21 which extends transversely of the vehicle. The axial coupling portion 13a of the second Bowden cable 10 extending toward the outside of the vehicle can fit into the coupling hole 21 from the inside of the vehicle.

In FIG. 5, part in which the recess 20 is formed at the lower end 91 of the locking lever 9 moves from an unlocking position A where the door can be opened and a locking position B where the door cannot be opened with locking motion of the locking knob. Part where the coupling hole 21 is formed at the lower end 111 of the inside lever 11 moves from a neutral position C to a door-opening position D where the door can be opened according to opening motion of the inside handle. Before the second Bowden cable 10 is coupled to the inside lever 11, the part where the coupling hole 21 of the inside lever 10 is formed is biased by a spring 30 counterclockwise so as to stop at a connecting position backward of the neutral position C in FIG. 7.

In FIGS. 1, 5 and 6, in the middle of the cable coupling area 17, a lever cover 22 covers the inner side of the lower end 91 of the locking lever 9 from the inside of the vehicle except the recess 20 and the front end and projects forward from the middle of the lower wall 16 of the cover 7 along a moving path of the lower end 91. On the outer side of the lever cover 22, an arcuate guide wall 22a projects along a moving path of the coupling portion 12 which fits in the recess 20. When the recess 20 moves between the unlocking position A and the locking position B, an outer circumferential surface of the coupling portion 12 of the first Bowden cable 8 which fits in the recess 20 is guided.

In the cable coupling area, an auxiliary cover 23 made of synthetic resin separately from the cover 7 is mounted from the inside of the vehicle.

In FIGS. 1 to 4, the auxiliary cover 23 has substantially the same shape as the cable coupling area 17, and is formed like a case of which an outer face which faces the cable coupling area 17 is open. On the upper and front edges of a vertical cover body 231 of the auxiliary cover 23, an upper portion 232 and a front portion 233 which project toward the outside of the vehicle to be continuous to each other fit in between the walls 16 and 16 when the auxiliary cover 23 is mounted over the cable coupling area 17. A lower portion 234 which is formed on the lower edge of the cover body 231 and extends toward the outside of the vehicle fits to cover a lower surface of the cable coupling area 17. The upper portion 232 and front portion 233 which fit in between the walls 16 and 16 of the cover 7 prevent rain water in the door from coming into the cable coupling area 17 due to labyrinth effect caused in the fitted portion.

At the rear edge of the cover body 231, an engagement portion 236 which extends transversely toward the outside of the vehicle and has an engagement hole 235 projects, and the engagement hole 235 engages with an engagement claw 24 at the lower rear end of the cover 7 when the auxiliary cover 23 is installed over the cable coupling area 17.

At the lower front end on the side of the cover body facing the outside of the vehicle, a guide shaft 25 which faces the outside of the vehicle projects to mount the auxiliary cover 23 over the cable coupling area 17. In order to attach the auxiliary cover 23 over the cable coupling area 17, the guide shaft 25 fits in a cylinder 26 which projects at the lower front end of the cable coupling area 17.

On the side of the cover body 231 which faces the outside of the vehicle near the front end, a cable holding portion 27 has two vertically-arranged holding grooves 27a, 27a which are open longitudinally of the vehicle and transversely toward the outside of the vehicle. In the upper and lower holding grooves 27a, 27a, an annular groove 8c at the rear end of the outer tube 8a of the first Bowden cable 8 and an annular groove 10c at the rear end of the outer tube 10a of the second Bowden cable 10 fit and do not thus move axially or longitudinally of the vehicle.

Behind the cable holding portion 27, a guide 28 which extends longitudinally of the vehicle faces the upper holding groove 27a and projects on the side of the cover body 231 facing the outside of the vehicle. The front part of the guide 28 is wider than the rear part, so that a positioning step 28a on which an outer circumferential surface of the coupling portion 12 of the first Bowden cable 8 fits is formed in FIG. 3. Before the auxiliary cover 23 is mounted over the cable coupling area 17, the coupling portion 12 of the first Bowden cable 8 engages on the positioning step 28a. Hence, the coupling portion 12 is positioned in the recess 20 at the lower end 91 of the locking lever 9 longitudinally of the vehicle in FIG. 6.

At the rear end of the cover body 231, a positioning hole for provisionally holding the coupling portion 13 of the second Bowden cable 10 is formed behind the lower holding groove 27a of the cable holding portion 27. Before the auxiliary cover 23 is installed over the cable coupling area 17, the positioning portion 13b of the coupling portion 13 of the second Bowden cable 10 is fitted from the side toward the outside of the vehicle into the positioning hole 29. Thus, the coupling portion 13 of the second Bowden cable 10 is positioned into the coupling hole 21 at the lower end 111 of the inside lever 11 longitudinally of the vehicle in FIG. 7.

Then, how to connect the first and second Bowden cables 8, 10 and auxiliary cover 23 will be described.

Before the auxiliary cover 23 is attached over the cable coupling area 17, the ends of the outer tubes 8a, 10a of the first and second Bowden cables 8, 10 are fitted in the holding grooves 27a, 27a of the cable holding portion 27 of the auxiliary cover 23 and do not thus move longitudinally.

Then, the coupling portion 12 of the inner cable 8b of the first Bowden cable 8 is fitted in the positioning step 28a of the guide 28. The positioning portion 13b of the coupling portion 13 of the inner cable 10a of the second Bowden cable 10 is fitted in the positioning hole 29 of the auxiliary cover 23 for provisional holding, so that the coupling portion 13 is positioned not to move vertically and longitudinally.

Then, the engagement hole 23b of the elastic engagement portion 23b of the auxiliary cover 23 is engaged with the claw 24 at the rear end of the cover 7. The guide portion 25 is inserted into the tube 26 of the cable coupling area 17. Hence, the auxiliary cover 23 and the first and second Bowden cables 8 and 10 held thereby are attached to the cable coupling area 17 toward the outside of the vehicle at the same time. When the auxiliary cover 23 is attached over the cable coupling area 17, as mentioned above, the coupling portion 12 of the first Bowden cable 8 and the coupling portion 13 of the second Bowden cable 10 are positioned with the auxiliary cover 23. Thus, the coupling portion 12 of the first Bowden cable 8 are fitted into the recess 20 of the locking lever 9, and the axial coupling portion 13a of the coupling portion 13 of the second Bowden cable 10 are fitted into the coupling hole 21 of the inside lever 11 in the connected position toward the outside of the vehicle automatically in FIGS. 6 and 7.

Figure 8:
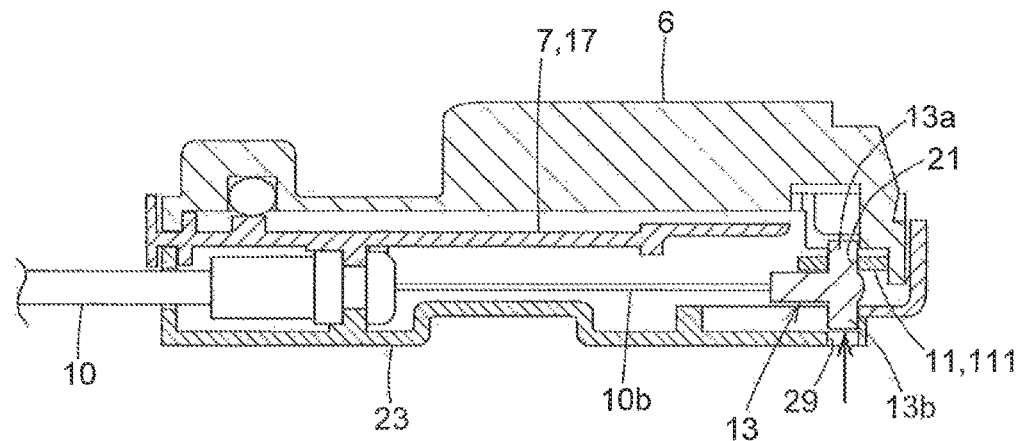
FIG. 8 is a horizontal sectional plan view in which a positioning axial portion is disengaged from a positioning hole of the auxiliary cover.

In FIG. 8, the positioning portion 13b fitted in the positioning hole 29 of the auxiliary cover 23 is pressed toward the outside of the vehicle as shown by an arrow and left from the positioning hole 29. The axial coupling portion 13a is deeply fitted in the coupling hole 21 of the inside lever 11.

Figure 9:
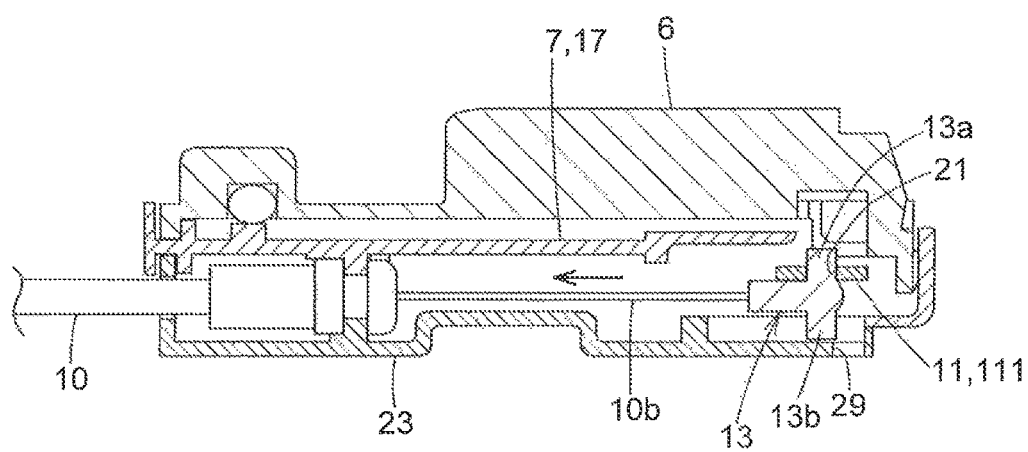
FIG. 9 is a horizontal sectional plan view in which a coupling portion of the Bowden cable and the lower end of an inside lever are moved to a usual operating position.

Lastly, as shown in FIG. 9, in order that the lower end 111 of the inside lever 11 may move to the neutral position C in FIG. 5, the other end of the inner cable 10b of the second Bowden cable 10 is coupled to the inside handle. Thus, the positioning portion 13b is unlikely to fit in the positioning hole 29 of the auxiliary cover 23. So, the lower end 111 of the inside lever 11 can move without hindrance from the neutral position C in FIG. 5 to the door-opening position D where the door can be opened, by opening motion of the inside handle.

Meanwhile, when the coupling portion 12 of the first Bowden cable 8 fitted in the recess 20 at the lower end 91 of the locking lever 9 is in the unlocking position "A" in FIG. 5, the outer circumferential surface of the coupling portion 12 opposite the recess 20 is close to or is in contact with the side surface, close to the outside of the vehicle, of the guide 28 of the auxiliary cover 23, so that the coupling portion 12 does not go out of the recess 20. Even when the coupling portion 12 moves from the unlocking position "A" toward the locking position "B", the outer circumferential surface opposite the recess 20 of the lever cover 22 of the cover 7 moves along the guide wall 22a of the lever cover 22 of the cover 7, so that the coupling portion 12 is unlikely to go out of the recess 20.

As described above, in the door latch device 1 in the foregoing embodiment, the auxiliary cover 23 is made separately from the cover 7. On the auxiliary cover 23 which is not fixed to the cable coupling area 17, the ends of the first Bowden cable 8 and second Bowden cable 10 are formerly held and fixed not to move axially. The couplings 12, 13 are positioned and held on the auxiliary cover 23, thereby attaching the auxiliary cover 23 to the cable coupling area 17 of the cover 7 and the couplings 12, 13 of the first and second Bowden cables 8, 10 to the recess 20 of the locking lever 9 and the coupling holes 21 of the inside lever 11 from the same direction or from the inside of the vehicle at the same time more effectively to improve connectivity.

The auxiliary cover 23 is coupled to the cable coupling area 17, and the locking lever 9 and inside lever 11 are coupled to the housing 6 in the same direction, thereby coupling them on an automatically assembling line of the door latch device more effectively.

As mentioned above, one embodiment of the present invention is described, and the following variations and modifications can be made to the embodiment without departing from the gist of the invention.

In the foregoing embodiment, the lever cover 22 is provided on the cover 7, and the arcuate guide projection 22a is provided on the lever cover 22. The coupling portion 12 of the first Bowden cable 8 is guided along the guide projection 22a to move, thereby preventing the coupling portion 12 from leaving the recess 20. But, without the lever cover 22, the guide projection 22 as above may be provided on the auxiliary cover 23 to be continuous with the guide 28 along a moving path of the coupling portion 12.

In the foregoing embodiment, the coupling portion 12 of the first Bowden cable 8 is spherical, but may be T-shaped as well as the coupling portion 13 of the second Bowden cable 10. A coupled portion of the locking lever 9 may be a hole instead of the recess 20. A positioning hole which can fit with the a positioning shaft of the T-shaped coupling may be formed in the cover 7, and the T-shaped coupling may be coupled with the coupling hole of the locking lever 9 in the same coupling way as the second Bowden cable 10. In the usual operation area of the locking lever 9, the first Bowden cable 8 is slightly rotated in a locking direction to couple with the locking knob so as not to fit the positioning portion in the positioning hole.

The positioning hole 29 of the cover 7 may be closed by fitting an axial closing member after the coupling portion 13 is coupled to the inside lever 11.

What is claimed is:

1. A vehicle door latch device comprising:
   a housing having a coupling area;
   a motion-transmitting member having a coupling portion at an end to enable motion of an operating device on a door to be transmitted;
   an operating lever pivotally mounted in the housing and having a coupled portion which can be coupled to the coupling portion at the end of the motion-transmitting member;
   an auxiliary cover which is fixed to the coupling area of the housing and covering the coupling portion of the motion-transmitting member and the coupled portion of the operating lever,
   the auxiliary cover comprising a holding portion for holding the motion-transmitting member; and
   positioning means for positioning the coupling portion of the motion-transmitting member at a side facing the coupling area,
   wherein the positioning means is in contact with the coupling portion and directly supports the coupling portion,
   wherein, when the auxiliary cover is not fixed to the coupling area, the motion-transmitting member is held by the holding portion and the coupling portion of the motion-transmitting member is positioned by the positioning means to make the auxiliary cover fixed over the coupling area enabling the coupling portion of the motion-transmitting member to be coupled to the coupled portion of the operating lever which is stationary at a predetermined position,
   wherein the motion-transmitting member is a Bowden cable in which an inner cable passes through an outer tube, an end of the outer tube is held by the holding portion so as not to move axially, and the coupling portion at an end of the inner cable is positioned by the positioning means, wherein the coupling portion comprises an axial coupling portion and an axial positioning portion which are directed opposite one another perpendicular to the inner cable, the coupled portion of the operating lever is a coupling hole in which the axial coupling portion fits, the auxiliary cover has a positioning hole as the positioning means in which the axial positioning portion can fit, and the axial positioning portion can leave the positioning hole after the axial coupling portion fits in the coupling hole while the axial positioning portion is provisionally held in the positioning hole.

2. A vehicle door latch device comprising:

a housing having a coupling area;

a motion-transmitting member having a coupling portion at a first end to enable motion of an operating device on a door to be transmitted;

an operating lever pivotally mounted in the housing and having a coupled portion which is couplable to the coupling portion at the first end of the motion-transmitting member;

an auxiliary cover which is fixed to the coupling area of the housing and covering the coupling portion of the motion-transmitting member and the coupled portion of the operating lever;

the auxiliary cover comprising a holding portion for holding the motion-transmitting member; and positioning mechanism for positioning the coupling portion of the motion-transmitting member at a side facing the coupling area;

wherein the positioning mechanism is in contact with the coupling portion and directly supports the coupling portion, wherein, when the auxiliary cover is not fixed to the coupling area, the motion-transmitting member is retained by the holding portion and the coupling portion of the motion-transmitting member is positioned by the positioning mechanism to make the auxiliary cover fixed over the coupling area enabling the coupling portion of the motion-transmitting member to be coupled to the coupled portion of the operating lever which is stationary at a predetermined position, wherein the motion-transmitting member is a Bowden cable in which an inner cable passes through an outer tube, an end of the outer tube is held by the holding portion so as not to move axially, and the coupling portion at an end of the inner cable is positioned by the positioning means, wherein the coupling portion comprises an axial coupling portion and an axial positioning portion which are directed opposite one another perpendicular to the inner cable, the coupled portion of the operating lever is a coupling hole in which the axial coupling portion fits, the auxiliary cover has positioning hole as the positioning means in which the axial positioning portion can fit, and the axial positioning portion can leave the positioning hole after the axial coupling portion fits in the coupling hole while the axial positioning portion is provisionally held in the positioning hole.

* * * * *